Oct. 18, 1938.   S. M. D. MILLER   2,133,393
PEDAL ATTACHMENT
Filed Oct. 22, 1937
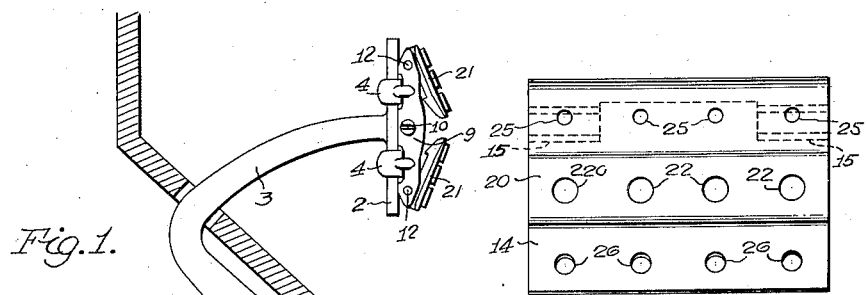
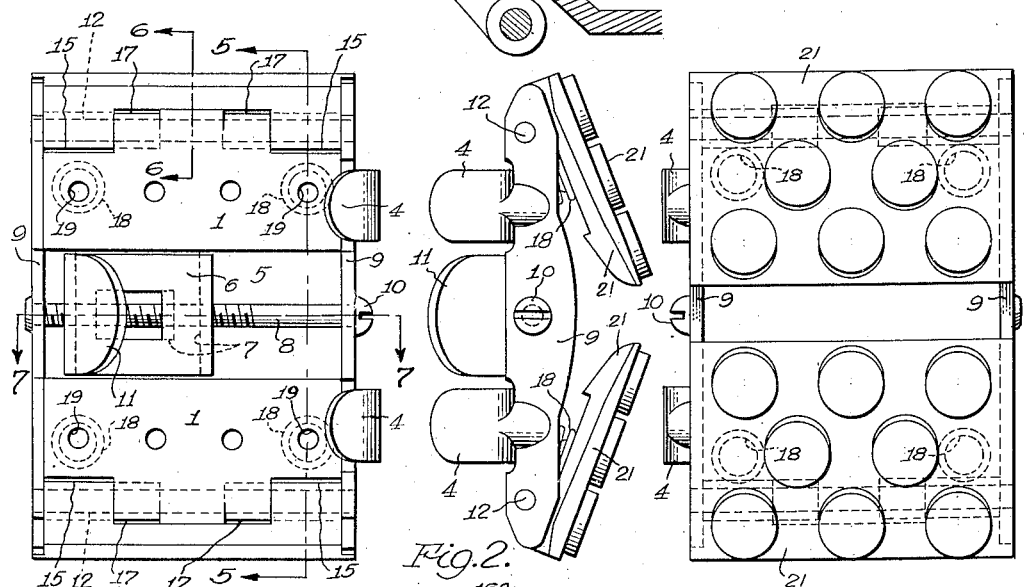
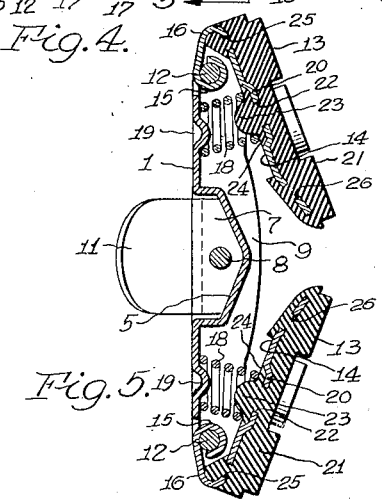
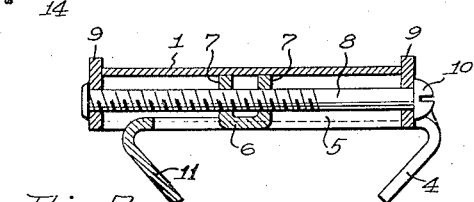
Inventor
Samuel M. D. Miller,
By
Attorneys Patented Oct. 18, 1938

2,133,393

UNITED STATES PATENT OFFICE 2,133,393

PEDAL ATTACHMENT

Samuel M. D. Miller, Detroit, Mich.

Application October 22, 1937, Serial No. 170,461

10 Claims. (Cl. 74—563)

This invention relates to an attachment for the foot pedal of a motor vehicle and more particularly to improvements in the construction and arrangement of the device shown in Letters Patent No. 2,040,866, issued to me on May 19, 1936.

An object of the present invention is to simplify and cheapen the manufacture of the device shown in said Letters Patent and to provide an arrangement whereby the pressure of the operator's foot is applied directly over the center of the tread of the pedal to which the device is attached, and further to provide a more compact construction wherein the overall length of the attachment is decreased. It is also an object of the present construction to provide means whereby a rubber tread may be molded in place upon the movable metal tread plate of the device, to firmly and permanently attach the rubber tread to the metal tread plate, and further to provide an arrangement of a plurality of pivoted tread plates arranged in opposed relation and individually yieldingly supported upon the base plate of the device, to individually yield when pressure is applied and to swing toward each other so that pressure may be applied to one or both of the yielding tread members.

A further object is to provide a very strong and rigid construction including certain other new and useful features, all as hereinafter more fully set forth, reference being had to the accompanying drawing in which Figure 1 is a side elevation of the attachment embodying the present invention and showing the same as applied to the tread plate of a clutch or brake pedal of a motor vehicle;

Fig. 2 is an enlarged side elevation of the attachment detached;

Fig. 3 is a plan view of the same;

Fig. 4 is an inverted plan view of Fig. 2;

Fig. 5 is a longitudinal section substantially upon the line 5—5 of Fig. 4;

Fig. 6 is a sectional detail of the pivoted end portion of one of the tread members, and Fig. 7 is a transverse section substantially upon the line 7—7 of Fig. 4.

The present device is for the same purpose as the device shown in the above referred to patent, to-wit, an attachment for the operating pedal of a motor vehicle and providing a yieldable tread for the pedal whereby pressure applied by the foot of the operator to operate the pedal, is cushioned and the power of the pedal is applied yieldingly and gradually to operate the brake or a clutch, depending upon the pedal to which the present device is attached.

The device embodying the present invention comprises a base plate 1 adapted to be detachably attached to a tread plate or member 2 of a motor vehicle operating pedal 3. This base plate 1 is detachably attached to the tread plate 2 by providing a plurality of downturned lugs 4 integral with the base plate 1 at one side edge thereof and adapted to hook over one side edge of the tread plate 2 of the pedal 3. The base plate 1 is also formed with a central transverse channel 5 formed by depressing the base plate 1 outwardly from its inner side, said channel forming a way and guide for a movable clamping member 6 formed with lugs 7 turned toward the bottom of the channel 5 and formed with screw-threaded openings to receive the transverse screw 8 mounted longitudinally within the channel 5 and supported at its ends within openings in end flanges 9 formed integral with the end edges of the base plate 1. This screw shaft 8 is provided at one end with a head 10 by means of which the screw may be turned to move the movable clamping member 6 longitudinally of the channel 5 and thus bringing the downturned end portion 11 of said member 6 into engagement with the edge of the tread plate 2 opposite that engaged by the lugs 4 to firmly clamp the present attachment to the tread plate of the motor vehicle pedal.

At each end of the base plate 1, is provided a pivot rod 12 extending through openings in the flanges 9, these rods 12 forming pivots for pivotally attaching movable tread members, each indicated as a whole by the numeral 13, to the base plate of the device, each tread member 13 comprising a tread plate 14 formed of pressed sheet metal with eyes 15 at the end of each plate 14 formed by ears 16 integral with the plate 14 and extending longitudinally therefrom to receive the pins or rods 12 and pivotally attach each of the tread members 13 to the end portions of the base plate 1 which base plate is also formed with integral eyes 17 corresponding to the eyes 15 and through all of which eyes the pivot rods 12 extend. The portion 16a of each plate 14 between the eyes 17 is curved and extended to engage the end of the plate 1 and form a stop to limit the outward swing of each tread member.

Interposed between each of the plates 14 and the base plate 1, is a pair of coiled springs 18, each of these springs being seated at one end over a protuberance 19 on the base plate 1 formed by forming said plate upwardly to provide such projection for holding each spring in seated position upon the base plate 1. The opposite end of each coiled spring 18 is seated within a channel 20 formed in the lower side of the opposed plate 14 of each tread member 13, and a tread 21 formed of rubber or other suitable material is secured to the upper face of each plate 14 of each pivoted tread member 13 by molding this rubber in place upon the plate 14 and permitting a portion of this rubber tread to extend through suitable openings 22 in the bottom of each depression 20 in each plate, forming a rubber stud 23 to project a short distance into the upper end of each spring 18 and thus provide a seat for this end of each spring, the head portion of each stud 23 being formed with an annular flange 24 filling the depressions 20 in the plates 14 and thus providing a rubber cushion or seat for the upper end of each spring 18 so that upon pivotal movement of the tread member or members 13, squeaks or noises occasioned by the engagement of the springs with the movable tread members 13 will be eliminated.

Each tread plate 14 of each tread member 13, is also formed with openings adjacent its pivot lugs or ears 16 so that when tread 21 is molded into engagement with each plate 14, the rubber will project through these openings, forming rubber studs 25 to firmly attach the pads 21 to each plate 14. Each plate 14 may also be formed with openings adjacent the free end of the plate as shown at 26 and when the rubber pad is molded in place upon the plate 14 the rubber will pass through these openings 26 and secure the pad to the plate 14, preferably the rubber pad being molded around the end of the plate to further assist in securing the pad to the plate.

The two yieldable tread members 13 are thus pivotally attached at one end to the opposite ends of the base plate 1 and these tread members extend in opposite directions longitudinally of the base plate and toward each other with their adjacent ends spaced apart and this space between said adjacent ends is directly opposite the transverse center of the base plate 1 so that if the operator should place his foot in contact with the two free ends of the tread members 13 and press downwardly thereon, the pressure applied to these tread members will swing them toward each other and apply power to the pedal plate 2 intermediate its ends and directly above the end of the pedal. If, however, the operator should engage his foot with but one of the pivoted tread members, that is, the lower tread member, the resistance to the swinging movement of this tread member against the action of the coiled springs therebeneath, will be less than the combined resistance offered by the two tread members when he places his foot in engagement with both and therefore the yielding movement of the single tread member will be greater than that of the two tread members, and therefore when the operator wishes to move the pedal a short distance, he will place his foot against the lower tread member 13 only and the application of the pressure to operate the brake or clutch will be more fully cushioned.

By molding the rubber tread 21 in place upon each plate 14, this rubber projecting through the openings in the plates and over the free ends of the plates, provides cushioning means to prevent metal to metal contact between the plates 14 and the base plate 1, thus preventing noise and together with the cushioning of the outer ends of the springs 18 by said rubber pads, will provide for silent operation of the tread members. Therefore all squeaks or noises due to the operation of the present attachment will be eliminated and long wear of the pads 21 is insured by their firm and secure attachment to the tread plates 14.

Having thus fully described my invention what I claim is:

1. A device for the purpose described including a pair of tread members, means for pivotally connecting said members to the pedal of a motor vehicle, said pivotal connection being located at one end of each of said tread members for independent pivotal movement of each member, and yielding means for resisting the pivotal movement of each tread member independently of the other member.

2. A device for the purpose described including a pair of tread members, means for pivotally attaching each tread member at one end to a pedal of a motor vehicle with the free ends of said tread members in opposed and spaced apart relation, and yieldable means for resisting the pivotal movement of each tread member in one direction.

3. A device for the purpose described including a base plate, means for attaching said plate to the pedal of a motor vehicle, a pair of tread members each pivotally attached at one end to said base plate with their free ends in opposed and spaced apart relation, and yieldable means for resisting the pivotal movement of each tread member independently of the other and in one direction.

4. A device of the character described including a base plate provided with lugs at one side for detachable engagement with the tread plate of a motor vehicle pedal, movable means carried by said base plate to engage the opposite side edge of said treadle tread plate, a pair of tread members each pivotally attached at one end to said base plate with their free ends in opposed and spaced apart relation and yieldable means beneath each tread member for resisting pivotal movement of each member independently of the other.

5. A device for the purpose described including a base plate, means carried by said base plate for detachably attaching said plate to the tread plate of a motor vehicle pedal, a pair of tread members each pivotally attached adjacent one end of said base plate for swinging movement toward and from said base plate with the adjacent ends of said tread members spaced apart and in opposed relation, and yieldable means interposed between each tread member and said base plate for resisting pivotal movement of each tread member independently of the other and in one direction.

6. An attachment for motor vehicle pedals including a base plate having side flanges, means for detachably attaching said base plate to the tread portion of a motor vehicle pedal, a pair of tread members each formed with an eye at one end, pivot pins extending through openings adjacent the ends of said side flanges of said base plate and through said eyes of said tread members for pivotally attaching said tread members to said base plate adjacent each end of said base plate with said tread members in opposed and spaced apart relation at their free ends and yieldable means interposed between each tread member and said base plate for resisting pivotal movement of said tread members towards said base plate.

7. An attachment for motor vehicle pedals including a base plate having side flanges and lugs projecting from one of said flanges to engage an edge of a tread plate of a motor vehicle pedal, said base plate being formed of sheet metal with a transverse channel intermediate its ends, a slide movable within and guided by said channel, means mounted within openings in said side flange of said base plate for moving said slide longitudinally of said channel, said slide having a lug at one end to engage the side edge of the tread plate of the pedal opposite that engaged by said lugs on said base plate, a pair of tread members each pivotally attached to said base plate at one end with the free ends of said tread members in opposed and spaced apart relation to swing upon their pivots toward and from said base plate each independently of the other, and a coiled spring interposed between each tread member and said base plate for resisting pivotal movement of said tread members towards said base plate.

8. An attachment as in claim 7, and wherein each tread member includes a tread plate formed with openings and a rubber pad for each tread plate secured thereto by molding said pad in engagement with said plate and with portions projecting through said openings in said tread plate.

9. An attachment as in claim 7, and wherein each tread member includes a sheet metal tread plate formed with a transverse channel and openings in the bottom of said channel, a rubber pad for each tread plate secured thereto by molding said pad in engagement with said plate and with portions projecting through said openings in said channel to form seats within said channel for the outer ends of said coiled springs and also forming studs projecting into said ends of said springs.

10. An attachment for motor vehicle pedals including a base plate formed of sheet metal with a transverse channel and protuberances, a slide guided within said channel for the detachable attachment of said base plate to the tread plate of a pedal, a pair of tread members each provided with a tread plate formed of sheet metal and integral eyes at one end of said tread plate, each tread plate being also formed with a transverse channel having an opening in the bottom thereof, a rubber pad for each tread member, each of said pads being molded in place upon said tread plate with portions of the rubber extending over the free end of the tread plate and other portions extending through said openings in said transverse channels of said tread plates and into said channels to form seats for the outer ends of coiled springs, said portions of said tread pads extending in the form of studs projecting into the outer ends of springs, and coiled springs seated at one end over said protuberances on said base plate and at their opposite ends over said rubber studs, and stops for limiting the swinging movement of said tread members away from said base plate by the action of said springs.

SAMUEL M. D. MILLER.